United States Patent
Bulan et al.

(10) Patent No.: US 10,202,700 B2
(45) Date of Patent: Feb. 12, 2019

(54) OXYGEN-CONSUMING ELECTRODE AND METHOD FOR PRODUCING SAME

(75) Inventors: Andreas Bulan, Langenfeld (DE); Norbert Wagner, Sindelfinden (DE); Gregor Polcyn, Dortmund (DE); Lisa Rossrucker, Wetter (DE); Michael Marx, Wächtersbach (DE)

(73) Assignee: Covestro Deutschland AG, Leverkusen (DE)

( * ) Notice: Subject to any disclaimer, the term of this patent is extended or adjusted under 35 U.S.C. 154(b) by 503 days.

(21) Appl. No.: 13/818,832

(22) PCT Filed: Aug. 23, 2011

(86) PCT No.: PCT/EP2011/064415
§ 371 (c)(1),
(2), (4) Date: May 30, 2013

(87) PCT Pub. No.: WO2012/025503
PCT Pub. Date: Mar. 1, 2012

(65) Prior Publication Data
US 2013/0236797 A1    Sep. 12, 2013

(30) Foreign Application Priority Data

Aug. 26, 2010  (DE) .................. 10 2010 039 846

(51) Int. Cl.
| | | |
|---|---|---|
| H01M 4/00 | (2006.01) | |
| C25B 11/04 | (2006.01) | |
| C25B 11/03 | (2006.01) | |
| H01M 4/86 | (2006.01) | |
| H01M 4/92 | (2006.01) | |
| H01M 12/06 | (2006.01) | |

(52) U.S. Cl.
CPC ........ *C25B 11/0442* (2013.01); *C25B 11/035* (2013.01); *C25B 11/0478* (2013.01); *H01M 4/8605* (2013.01); *H01M 4/921* (2013.01); *H01M 12/06* (2013.01)

(58) Field of Classification Search
CPC .... H01M 4/8605; H01M 4/921; H01M 12/06; C25B 11/0442; C25B 11/035; C25B 11/0478
USPC .................................................. 429/405, 523
See application file for complete search history.

(56) References Cited

U.S. PATENT DOCUMENTS

| | | | | |
|---|---|---|---|---|
| 3,318,736 A | * | 5/1967 | Barber | .................... H01M 4/90 429/505 |
| 4,364,803 A | * | 12/1982 | Nidola | ..................... C25B 9/10 204/252 |
| 4,603,118 A | | 7/1986 | Staab | |
| 4,806,515 A | | 2/1989 | Luczak et al. | |
| 6,165,332 A | | 12/2000 | Gestermann et al. | |
| 7,566,388 B2 | | 7/2009 | Sasaki et al. | |
| 2003/0162074 A1 | * | 8/2003 | Menjak | ............... H01M 4/8605 429/458 |
| 2003/0198852 A1 | * | 10/2003 | Masel | ................. H01M 4/8605 429/494 |
| 2004/0152588 A1 | | 8/2004 | Janowitz et al. | |
| 2006/0260955 A1 | * | 11/2006 | Sasaki | ...................... B01J 23/66 205/759 |
| 2006/0263232 A1 | | 11/2006 | Bulan | |
| 2008/0038623 A1 | | 2/2008 | Schmidt et al. | |
| 2008/0113257 A1 | | 5/2008 | Hampden-Smith et al. | |

FOREIGN PATENT DOCUMENTS

| | | |
|---|---|---|
| CA | 2619258 A1 | 3/2007 |
| DE | 2021009 A1 | 2/1971 |
| DE | 19622744 C1 | 7/1997 |
| DE | 10130441 A1 | 3/2003 |
| DE | 102005043127 A1 | 3/2007 |
| EP | 115845 A2 | 8/1984 |
| EP | 0149293 A1 | 7/1985 |
| EP | 1033419 A1 | 9/2000 |
| EP | 1156543 A2 | 11/2001 |
| EP | 1574598 A1 | 9/2005 |
| EP | 1728896 A2 | 12/2006 |
| WO | WO-2005081351 A1 | 9/2005 |
| WO | WO-2008/006909 A2 | 1/2008 |
| WO | WO-2008037411 A1 | 4/2008 |

OTHER PUBLICATIONS

Translation of the International Preliminary Report on Patentability for PCT/EP2011/064415 dated Feb. 26, 2013.
International Search Report for PCT/EP2011/064415 dated Nov. 7, 2011.
Search Report for priority DE 10 2010 039 846.2 dated Oct. 10, 2011.

* cited by examiner

*Primary Examiner* — Nicholas P D'Aniello
(74) *Attorney, Agent, or Firm* — Drinker Biddle & Reath LLP

(57) ABSTRACT

An oxygen-consuming electrode, in particular for use in chloralkali electrolysis, having a novel catalyst coating and also an electrolysis apparatus are described. Furthermore, its use in chloralkali electrolysis, fuel cell technology or metal/air batteries is described. The oxygen-consuming electrode comprises at least a support which in particular is electrically conductive, a layer containing a catalyst and a hydrophobic layer, characterized in that it contains gallium in addition to silver as catalytically active component.

14 Claims, No Drawings

OXYGEN-CONSUMING ELECTRODE AND METHOD FOR PRODUCING SAME

CROSS-REFERENCE TO RELATED APPLICATIONS

This application is a national stage application (under 35 U.S.C. § 371) of PCT/EP2011/064415, filed Aug. 23, 2011, which claims benefit of German Application No. 10 2010 039 846.2, filed Aug. 26, 2010, all of which are incorporated herein by reference in their entirety.

The invention relates to an oxygen-consuming electrode, in particular for use in chloralkali electrolysis, having a novel catalyst coating and also an electrolysis apparatus. The invention further relates to a process for producing the oxygen-consuming electrode and also to its use in chloralkali electrolysis, fuel cell technology or in metal/air batteries.

The invention proceeds from oxygen-consuming electrodes which are known per se and are configured as gas diffusion electrodes and usually comprise an electrically conductive support and a gas diffusion layer having a catalytically active component.

Various proposals for operating oxygen-consuming electrodes in electrolysis cells of industrial size are essentially known from the prior art. The basic idea here is to replace the hydrogen-evolving cathode of the electrolysis (for example in chloralkali electrolysis) by the oxygen-consuming electrode (cathode). An overview of possible cell designs and solutions may be found in the publication by Moussallem et al "Chlor-Alkali Electrolysis with Oxygen Depolarized Cathodes: History, Present Status and Future Prospects", J. Appl. Electrochem. 38 (2008) 1177-1194.

The oxygen-consuming electrode, hereinafter also referred to as OCE for short, has to meet a number of basic technical requirements in order to be able to be used in industrial electrolysers. Thus, the catalyst and all other materials used have to be chemically stable to sodium hydroxide solution having a concentration of about 32% by weight and to pure oxygen at a temperature of typically from 80-90° C. A high measure of mechanical stability is likewise required since the electrodes are installed and operated in electrolysers having a size of usually greater than 2 m$^2$ in area (industrial size). Further properties are: a high electrical conductivity, a low layer thickness, a high internal surface area and a high electrochemical activity of the electrocatalyst. Suitable hydrophobic and hydrophilic pores and an appropriate pore structure for the conduction of gas and electrolyte are likewise necessary, as is impermeability so that gas and liquid space remain separate from one another. The long-term stability and low production costs are further particular requirements which an industrially usable oxygen-consuming electrode has to meet.

Oxygen-consuming electrodes according to the prior art are used in a variety of arrangements in electrochemical processes, for example in the generation of power in fuel cells or in the electrochemical preparation of chlorine from aqueous solutions of sodium chloride. A more detailed description of chloralkali electrolysis using an oxygen-consuming electrode may be found in Journal of Applied Electrochemistry, Vol 38 (9), pages 1177-1194 (2008). Examples of electrolysis cells having oxygen-consuming electrodes may be found in the documents EP 1033419B1, DE 19622744C1 and WO 2008006909A2.

The catalyst used for the OCE technology is generally a metal, a metal compound, a nonmetallic compound or a mixture of metal compounds or nonmetallic compounds. However, metals, in particular metals of the platinum group, applied to a carbon support are also known. Platinum and silver have been found to be the most active catalysts (Moussallem et al "Chlor-Alkali Electrolysis with Oxygen Depolarized Cathodes: History, Present Status and Future Prospects", J. Appl. Electrochem. 38 (2008) 1177-1194). Here, silver is significantly more advantageous than platinum as raw material and has been found to be stable over the long term, especially under the conditions of chloralkali electrolysis.

However, silver is also subject to deactivation in an alkali medium, as described in DE10130441B4. To avoid this corrosion, i.e. to increase the stability of the silver catalyst, various alloys with heavy metals which are stable to caustic alkalis, e.g. nickel, bismuth, ruthenium, platinum, palladium, gold, mercury and copper, have been used, as described in DE10130441B4 and EP0115845. However, these alloys do not display an increased activity of the catalyst but serve merely to increase the stability in an alkali medium. DE2021009 describes a silver catalyst for use in fuel cells, which has proportions of mercury and copper and leads to a somewhat higher cell voltage compared to platinum catalysts but has an increased long-term stability.

Many further catalysts have been examined for suitability in oxygen-consuming cathodes. Moussallem et al "Chlor-Alkali Electrolysis with Oxygen Depolarized Cathodes: History, Present Status and Future Prospects", J. Appl. Electrochem. 38 (2008) 1177-1194 mentions palladium, ruthenium, gold, nickel, oxides and sulphides of transition metals and perovskites. Although some of the catalysts mentioned have been found to be more active, they have been found to be unsuitable in long-term operation due to the low stability in an alkali medium.

To increase the activity of silver catalysts, various mixtures of metals of the platinum group, e.g. silver, platinum or palladium, with rare earth metal oxides, e.g. cerium oxide, and alkaline earth metals, e.g. magnesium, have been examined for use in carbon-based electrodes in U.S. Pat. No. 7,566,388. Measurements on these catalysts supported on carbon show an improved activity of the electrodes. However, carbon is not well-suited as support material for OCEs since it is oxidized by oxygen and is thus not stable over the long term.

EP0149293 discloses an electrocatalyst for use in fuel cells, in particular in phosphoric acid fuel cells, in which a platinum/gallium alloy supported on carbon is used as catalytically active substance. Compared to pure platinum, this catalyst displays an increased stability but a lower activity, characterized by a higher cell voltage. Further disadvantages of this catalyst are the use of expensive platinum and the use of carbon as catalyst support, which is oxidized during use as OCE.

U.S. Pat. No. 4,806,515 discloses a platinum/gallium electrocatalyst for fuel cells, which contains a further component from the group consisting of chromium, cobalt and nickel and mixtures thereof and is likewise characterized by an increased long-term stability compared to, for example, a platinum/cerium/cobalt mixture. Here too, the catalyst is a catalyst supported on carbon and has a lower activity than the comparative catalyst.

It is an object of the present invention to provide an oxygen-consuming electrode, in particular for use in chloralkali electrolysis, which overcomes the abovementioned disadvantages and makes possible a higher activity of the catalyst in the OCE in chloralkali electrolysis.

The stated object is solved according to the invention by an oxygen-consuming electrode comprising at least an in particular electrically conductive support, an electric contact point, a gas diffusion layer and a silver-based catalyst, characterized in that the catalyst additionally contains gallium as catalytically active component.

It has surprisingly been found that a mixture of silver and gallium as active component in an OCE leads to a higher activity of the catalyst.

Preference is given to an embodiment of the novel OCE which is characterized in that the catalytically active component contains gallium in an amount of from 0.1 to 10% by weight, preferably from 1 to 8% by weight, particularly preferably from 2 to 6% by weight, based on the total weight of the catalytically active component.

A further preferred variant of the OCE is characterized in that the electrode has a total loading of catalytically active component in the range from 5 mg/cm$^2$ to 300 mg/cm$^2$, preferably from 10 mg/cm$^2$ to 250 mg/cm$^2$.

The novel OCE preferably has a support consisting of a material selected from the group consisting of silver, oxidation-stable carbon, nickel, coated nickel, e.g. silver-coated nickel, nickel-copper alloys and coated nickel-copper alloys such as silver-plated nickel-copper alloys, from which sheet-like textile structures are produced.

The electrically conductive support can in principle be a gauze, nonwoven, foam, woven fabric, braid or expanded metal. The support can have one or more layers. A multilayer support can be made up of two or more superposed gauzes, nonwovens, foams, woven fabrics, braids or expanded metals. The gauzes, nonwovens, foams, woven fabrics, braids or expanded metals can be different. They can, for example, have different thicknesses or different porosities or have a different mesh opening. Two or more gauzes, nonwovens, foams, woven fabrics, braids or expanded metals can be joined to one another by, for example, sintering or welding. Preference is given to using a nickel gauze having a wire diameter of from 0.04 to 0.4 mm and a mesh opening of from 0.2 to 1.2 mm.

The support of the OCE is particularly preferably based on nickel, silver or a combination of nickel and silver.

Preference is also given to a form of the OCE in which the support is present in the form of a gauze, woven fabric, formed-loop knit, drawn-loop knit, nonwoven, expanded metal or foam, preferably a woven fabric.

The invention also provides a process for producing the novel oxygen-consuming electrode, characterized in that a mixture of hydrophobic polymer particles, in particular PTFE, and catalytically active metal composed of silver and the secondary constituent gallium is produced and distributed in one or more steps on an electrically conductive support to produce one or more layers and is densified under pressure.

The invention further provides a process for producing the novel oxygen-consuming electrode, characterized in that a dispersion of hydrophobic polymer particles, in particular PTFE, and catalytically active material composed of silver and the secondary constituent gallium in a dispersion medium is produced and sprayed in one or more steps onto an electrically conductive support to produce one or more layers and the dispersion medium is removed.

The OCEs of the invention can be produced, as described above, by spray or dispersion and dry processes.

The novel oxygen-consuming electrode is preferably connected as cathode, in particular in an electrolysis cell for the electrolysis of alkali metal chlorides, preferably of sodium chloride or potassium chloride, particularly preferably sodium chloride.

As an alternative, the oxygen-consuming electrode can preferably be connected as cathode in a fuel cell. Preferred examples of such fuel cells are: alkaline fuel cells.

The invention therefore further provides for the use of the novel oxygen-consuming electrode for the reduction of oxygen in an alkali medium, in particular in an alkaline fuel cell, the use in mains water treatment, for example for the production of sodium hypochlorite, or the use in chloralkali electrolysis, in particular for the electrolysis of LiCl, KCl or NaCl or as electrode in a metal/air battery.

The novel OCE is particularly preferably used in chloralkali electrolysis and here especially in the electrolysis of sodium chloride (NaCl).

The invention is illustrated below by the examples which do not, however, restrict the scope of the invention.

EXAMPLES

Determination of the Electrocatalytic Activity of the Electro Catalysts

The cell voltage established at a particular current density in an electrolysis cell depends on various factors (Hamann, Vielstich, 2005, "Elektrochemie", p. 157 ff, Wiley-VCH).

For a reaction to proceed in an electrolysis cell a voltage firstly has to be applied. The decomposition voltage can be determined theoretically from the difference in the redox potentials. This is obtained via the Nernst equation. However, if an electrolysis is carried out, a higher voltage than that calculated from the Nernst equation has to be applied.

Ohmic resistances in the electrodes, in the electrolyte solution and in the membrane result in ohmic voltage drops. Furthermore, the voltage applied to the electrolysis cell, viz. the potential E of an electrode, differs from the equilibrium potential $E^0$.

$$\eta = E - E^0 \quad (1)$$

Equation (1) defines the overvoltage $\eta$. This is caused, for example, by kinetic limitation of the electrode reactions.

The overvoltage of redox electrodes is made up of three components: the transmission overvoltage $\eta_D$, the reaction overvoltage $\eta_r$ and the diffusion overvoltage $\eta_d$. The reaction overvoltage and the diffusion overvoltage are dependent on the concentration of the reactants. They can therefore be combined as a concentration overvoltage. The reaction overvoltage $\eta_r$ arises when a chemical subreaction is limited. This can occur, for example, as a result of slow adsorption or desorption. Mass transfer to the electrode surfaces or from the electrode surfaces results in the diffusion overvoltage $\eta_d$.

An electrolytic double layer is formed at the phase boundary between electrode and electrolyte. In the case of the electrolysis in the anode space, this consists of a layer of positive charges on the electrode surface and also a layer of negative charges in the electrolyte solution (conversely in the cathode space). An electric potential difference therefore arises between the electrode and the electrolyte solution. In the transmission reaction, charge carriers go through the electrolytic double layer from one phase into the other phase. Here, a potential-dependent activation energy has to be overcome. If this is high, the transmission reaction is greatly inhibited and the rate of the transmission reaction is small. This can be equated to a low activity of the electrocatalyst.

To describe this transmission reaction, the current-voltage relationship, also known as the Butler-Volmer equation, is used.

At the surface of a redox electrode, electrodes are taken up by the metal and also released. This results in an anodic partial current density $i_D^+$ and a cathodic partial current density $i_D^-$. The total current density passing through the double layer is therefore given by $$i_D = i_D^+ + i_D^- \quad (2)$$

The Butler-Volmer equation can be derived from the dependence of the potential on the activation energy. This equation describes the dependence of the total current density on the cathodic and anodic transmission overvoltages.

$$i_D = i_D^+ + i_D^- = i_0\left[\exp\left(\frac{\alpha zF}{RT}\cdot\eta_D\right) - \exp\left(\frac{-(1-\alpha)zF}{RT}\cdot\eta_D\right)\right] \quad (3)$$

Here:
$i_D$=current density [A/m2], $i_0$=exchange current density [A/m2], $\alpha$=transmission factor, z=ion valency, R=gas constant [J/Kmol], $\eta_D$=transmission overvoltage [V], F=Faraday constant [C/mol] and T=temperature [K].

There is therefore an exponential increase in the current density with the increasing (more positive and also more negative) overvoltage.

The Butler-Volmer equation can be simplified for the limiting case of large overvoltages (as are present in electrolysis) by disregarding the respective counterreaction. The following transformations are carried out here only for the cathodic current and apply analogously to the anodic current.

$$i_D = -i_0\exp\left(\frac{-(1-\alpha)zF}{RT}\cdot\eta_D\right) \quad (4)$$

Taking logarithms and rearranging to give $\eta$ results in $$\eta_D = \frac{RT}{(1-\alpha)zF}\cdot 2.3\cdot lg i_0 - \frac{RT}{(1-\alpha)zF}\cdot 2.3\cdot lg|i_D| \quad (5)$$
$$= \frac{RT}{(1-\alpha)zF}\cdot \ln i_0 - \frac{RT}{(1-\alpha)zF}\cdot \ln|i_D|$$

This equation can also be presented in semilogarithmic form.

$$\eta_D = A + B\cdot lg|i_D| \quad (6)$$

Equation 6 is the Tafel line, where B is the Tafel gradient.

When, in the region of relatively high current densities, the transmission overvoltage is not rate-determining, but instead an adsorption reaction is superposed on the transmission reaction, the following adaptation of the Butler-Volmer equation, which describes a consecutive reaction mechanism, can be used.

$$i = \frac{2i_{0,1}i_{0,2}\left[\exp\left[\frac{(\alpha_1+\alpha_2)F\eta}{RT|}\right] - \exp\left[-\frac{(2-\alpha_1-\alpha_2)F\eta}{RT}\right]\right]}{i_{0,2}\exp\left[\frac{\alpha_2 F\eta}{RT}\right] + i_{0,1}\exp\left[-\frac{(1-\alpha_1)F\eta}{RT}\right]} \quad (7)$$

Here:
$i_D$=current density [A/m2], $i_0$=exchange current density [A/m2], $\alpha$=transmission factor, R=gas constant [J/Kmol], $\eta$=transmission overvoltage [V], F=Faraday constant [C/mol] and T=temperature [K].

To determine the Tafel gradients and thus the activity of the catalysts, galvanostatic switching-off measurements were carried out. When the cathode potentials determined here are plotted against NHE in a Tafel plot, viz. a plot of the current density against cathode potential, the Tafel gradients can be determined therefrom.

The above-described variant of the Butler-Volmer equation (equation 7) was used to fit the Tafel gradients I and II shown in Table 1 to the measured data of the individual electrodes in the Tafel plot by means of the Solver function in Excel. The Tafel gradient is here reported in mV/decade of the current density.

The Tafel gradient I describes the linear region of the Tafel plot in the region of relatively low current densities, the Tafel gradient II describes the linear region of the Tafel plot in the region of relatively high current densities.

Galvanostatic Switching-Off Measurement (Measurement Method)

To determine the cathode potential vs. NHE, sodium hydroxide solution was electrolysed in an electrolysis cell in order to effect reduction of oxygen at the cathode. Use was made of an electrolysis cell having a three-electrode arrangement, with the OCE dividing the cell into a gas space and an electrolyte space. A platinum sheet served as anode. The electrolysis area was 3.14 cm$^2$. Two Hydroflex® electrodes from Gaskatel were used as reference electrode and were connected to the electrolyte space via a Haber-Luggin capillary. The experiments were carried out at a temperature of 80° C., a sodium hydroxide concentration of 32% by weight and an oxygen concentration of 100% by volume. The measurement was started 1 µs after switching off.

As a further criterion for comparing the electrodes, the ohmic resistance was determined This can be determined in the form of the IR drop in mVm$^2$/kA from the difference between the cathode potential before and after switching off. The higher the IR drop, the higher the ohmic resistance of the electrode.

Process for Producing Catalyst Powder

The catalyst powder was produced by the following method:

Silver powder (Ag 311 from Ferro) was stirred in water at a temperature of 80° C. with addition of sodium dodecylsulphate in a Dispermat with a toothed disc until the silver had been completely deagglomerated. After complete agglomeration of the silver, the thermally liquefied gallium was added. The mixture was intensively mixed for 2 hours at a temperature of 80° C. in a Dispermat with a toothed disc and subsequently cooled slowly to room temperature with stirring. The product was filtered off, intensively washed and dried and at the same time heat-treated at 80° C. for 16 hours. The mixture was subsequently sieved through a 63 µm steel sieve.

The production process described leads to a powder whose physical data derived by analysis of the particle distribution by means of laser light scattering, the specific surface area by the BET method and the particle shape by means of a scanning electron microscope with EDX correspond to the standard values for silver particles (Ag311, Ferro).

Production of the Electrode

For the electrodes containing the catalyst powder produced by the above process, two different processes for producing the OCE, via the dry process and the spray process, were chosen.

Dry Process (Process Description)

The OCE was produced as follows: 3.5 kg of a powder mixture consisting of 7% by weight of PTFE powder, 88% by weight of silver(I) oxide and 5% by weight of catalyst powder produced by the above process were mixed in an IKA mill at a rotational speed of 15000 rpm in such a way that the temperature of the powder mixture did not exceed 48° C. This was achieved by the mixing operation being interrupted and the powder mixture being cooled. Mixing was carried out a total of four times at a mixing time of 15 seconds. After mixing, the powder mixture was sieved through a sieve having a mesh opening of 1.0 mm. The sieved powder mixture was subsequently applied to an electrically conductive support element. The support element was a nickel gauze having a wire thickness of 0.14 mm and a mesh opening of 0.5 mm. Application was carried out using a 2 mm thick template, with the powder being applied using a sieve having a mesh opening of 1.0 mm. Excess powder which projected above the thickness of the template was removed by means of a scraper. After removing of the template, the support with the applied powder mixture is pressed by means of a roller press at a pressing force of 0.57 kN/cm. The gas diffusion electrode was taken from the roller press.

The OCE produced in this way was electrochemically reduced before measurement in the measuring cell.

Spray Process (Process Description)

An aqueous suspension consisting of a gallium-doped or pure silver catalyst (AG311) from Ferro, produced by the above process, a PTFE suspension (TF5035R, 58% by weight, Dyneon™), a nonionic surfactant (Triton-X 100, Fluka Chemie AG) and hydroxyethylmethylcellulose (Walocel MKX 70000 PP 01, Wolff Cellulosics GmbH & Co. KG) as thickener was produced with various contents of silver and PTFE. A suspension having a catalyst content of 97% by weight was in each case produced as follows. 90 g of silver powder, 53.7 g of water and 1.5 g of surfactant were added to 150 g of the thickening solution (1% by weight of methylcellulose in water). After the suspension had been dispersed in a rotor-stator system (Ultra-Turrax T25 with the dispersing unit S25N-25F, IKA) at 13500 min$^{-1}$ for 5 minutes (with 2 minute pause between each 1 minute of dispersing in order to avoid excessive warming of the solution), 4.8 g of PTFE suspension were slowly added while stirring in order to avoid agglomeration.

The suspensions which had been produced in this way were then sprayed a number of times onto a nickel gauze (manufacturer: Haver & Boecker, 106×118 µm gauze, 63 µm wire thickness). The loading was selected so that 50% of the catalyst loading was applied in the middle and in each case 25% of the catalyst loading was applied to the electrolyte side and the gas side of the electrode. During spraying, the nickel gauze was maintained at a temperature of 100° C. After the desired total loading of 170 g/cm$^2$ of catalyst had been reached, the electrodes were fixed between two metal plates and hot pressed at a temperature of 130° C. and a pressure of 0.14 t/cm$^2$. The electrode was subsequently heated in air at 3 K/min and sintered at 340° C. for 15 minutes.

Example 1

OCE Containing 5% by Weight of Ga Based on Silver and Produced by Means of the Spray Process An OCE which had been produced using 5% by weight of gallium based on the total weight of silver and gallium by the above-described spray process was measured in the measuring cell. At −57.7 mV/decade, it displays a lower Tafel gradient I than the electrode containing standard silver catalyst AG311 (see Tab. 1), and at −123.8 mV/decade it displays only a slightly higher Tafel gradient II. Furthermore, the catalyst material of the electrode displays a lower ohmic resistance than the standard silver catalyst (see Tab. 1).

TABLE 1

Comparison of the first and second Tafel gradients and the IR drop of the various electrodes using 100% oxygen as reaction gas.

| Electrode | Tafel gradient I in mV/decade current density | Tafel gradient II in mV/decade current density | IR drop in mVm$^2$/kA |
|---|---|---|---|
| Comparative example Pure silver | −61.4 | −121.1 | 10.42 |
| 5% by weight of Ga Spray process | −57.7 | −123.8 | 9.39 |
| 5% by weight of Ga Dry process | −56.3 | −97.7 | 8.96 |

Example 2

OCE Containing 5% by Weight of Ga Based on Silver and Produced by Means of the Dry Process An OCE which had been produced using 5% by weight of gallium based on the total weight of silver and gallium by the above-described dry process was measured in the measuring cell. At −56.3 mV/decade, it displays a lower Tafel gradient I than the electrode containing standard silver catalyst AG311 (see Tab. 1), and at −97.7 mV/decade it displays a likewise lower Tafel gradient II. Furthermore, the catalyst material of the electrode likewise displays a lower ohmic resistance than the standard silver catalyst (see Tab. 1).

Example 3 (Comparative Example)

OCE Containing Pure Silver

An OCE which had been produced using the standard silver catalyst AG311 by the above-described spray process was measured in the measuring cell. It displays the behaviour shown in Tab. 1, with a considerably higher Tafel gradient I than the gallium-doped silver catalysts, a significantly higher Tafel gradient II than the gallium-doped silver catalyst produced by the spray process and a higher ohmic resistance than in the case of the catalyst material of the electrodes according to the invention.

The invention claimed is:

1. An oxygen-consuming electrode consisting of a support which is electrically conductive, a layer consisting of a silver-based catalyst, an electric contact point, and a gas diffusion layer, wherein the catalyst consists essentially of gallium and silver as catalytically active component, and wherein the electrode has a total loading of catalytically active component in the range from 5 mg/cm$^2$ to 300 mg/cm$^2$;

characterized in that the support consists of one or more materials selected from the group consisting of: silver, nickel, coated nickel, nickel-copper alloys and coated nickel-copper alloys.

2. An oxygen-consuming electrode consisting of a support which is electrically conductive, a layer consisting of a silver-based catalyst, an electric contact point, and a gas diffusion layer, wherein the catalyst consists of gallium and silver as catalytically active component, and wherein the electrode has a total loading of catalytically active component in the range from 10 mg/cm² to 250 mg/cm²;

characterized in that the support consists of one or more materials selected from the group consisting of: silver, nickel, coated nickel, nickel-copper alloys and coated nickel-copper alloys.

3. The oxygen-consuming electrode according to claim 2, wherein the support is configured as a nickel gauze having a wire diameter of from 0.04 to 0.4 mm and a mesh opening of from 0.2 to 1.2 mm.

4. The oxygen-consuming electrode according to claim 1, wherein the catalytically active component comprises gallium in an amount of from 0.1 to 10% by weight based on the total weight of the catalytically active component.

5. The oxygen consuming electrode according to claim 1, wherein the catalytically active component comprises gallium in an amount of from 1 to 8% by weight based on the total weight of the catalytically active component.

6. The oxygen consuming electrode according to claim 1, wherein the catalytically active component comprises gallium in an amount of from 2 to 6% by weight based on the total weight of the catalytically active component.

7. The oxygen-consuming electrode according to claim 1, wherein the electrode has a total loading of catalytically active component in the range from 10 mg/cm² to 250 mg/cm².

8. The oxygen-consuming electrode according to claim 1, wherein the support is based on nickel, silver or a combination of nickel and silver.

9. The oxygen-consuming electrode according to claim 1, wherein the support is present in the form of a gauze, woven fabric, formed-loop knit, drawn-loop knit, nonwoven, expanded metal or foam.

10. An electrolysis apparatus having the oxygen-consuming electrode according to claim 1 as oxygen-consuming cathode.

11. The electrolysis apparatus of claim 1, wherein the electrolysis apparatus is for chloralkali electrolysis.

12. A cathode in electrolysis, an electrode in a fuel cell, or an electrode in a metal/air battery comprising the oxygen-consuming electrode according to claim 1.

13. A process for producing the oxygen-consuming electrode according to claim 1, comprising producing a mixture of hydrophobic polymer particles, and catalytically active metal composed of silver and the secondary constituent gallium, distributing the mixture in one or more steps on an electrically conductive support to produce one or more layers, and densifying the mixture under pressure.

14. A process for producing the oxygen-consuming electrode according to claim 1, comprising producing a dispersion of hydrophobic polymer particles and catalytically active material composed of silver and the secondary constituent gallium in a dispersion medium, spraying the dispersion in one or more steps onto an electrically conductive support to produce one or more layers, and removing the dispersion medium.

* * * * *